(12) United States Patent
Li et al.

(10) Patent No.: US 11,056,905 B2
(45) Date of Patent: Jul. 6, 2021

(54) BATTERY CHARGING MANAGEMENT METHOD AND TERMINAL

(71) Applicant: Huawei Technologies Co., Ltd., Shenzhen (CN)

(72) Inventors: Shiliang Li, Beijing (CN); Zhen Yuan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 16/465,456

(22) PCT Filed: Jun. 6, 2017

(86) PCT No.: PCT/CN2017/087286
§ 371 (c)(1),
(2) Date: May 30, 2019

(87) PCT Pub. No.: WO2018/099029
PCT Pub. Date: Jun. 7, 2018

(65) Prior Publication Data
US 2019/0379234 A1 Dec. 12, 2019

(30) Foreign Application Priority Data
Nov. 30, 2016 (CN) .......................... 201611083493.5

(51) Int. Cl.
| | | |
|---|---|---|
| *H01M 10/44* | (2006.01) | |
| *H01M 10/46* | (2006.01) | |
| *H02J 7/06* | (2006.01) | |
| *H02J 7/00* | (2006.01) | |
| *H01M 10/42* | (2006.01) | |

(52) U.S. Cl.
CPC .................. *H02J 7/06* (2013.01); *H02J 7/00* (2013.01); *H02J 7/0063* (2013.01); *H01M 10/4257* (2013.01); *H02J 2007/0067* (2013.01)

(58) Field of Classification Search
CPC .... H02J 7/00712; H02J 7/0048; H02J 7/0063; H02J 7/0071; H01M 10/4257; H01M 10/052; H01M 10/443; H01M 10/486
(Continued)

(56) References Cited

U.S. PATENT DOCUMENTS 5,895,440 A * 4/1999 Proctor .................. B60L 58/22
702/63
7,294,990 B2 11/2007 Wang et al.
(Continued)

FOREIGN PATENT DOCUMENTS

| CN | 1858805 A | 11/2006 |
|---|---|---|
| CN | 1881734 A | 12/2006 |

(Continued)

OTHER PUBLICATIONS

Machine Translation and Abstract of Chinese Publication No. CN102544609, Jul. 4, 2012, 16 pages.
(Continued)

*Primary Examiner* — Edward Tso
(74) *Attorney, Agent, or Firm* — Conley Rose, P.C.

(57) ABSTRACT

A battery charging management method and a terminal, where the method includes charging, by the terminal, a battery according to a first charging policy, where the first charging policy includes a first voltage and a first current for charging the battery obtaining, by the terminal, a battery capacity of the battery when the terminal fully charges the battery for N times, where N is a positive integer determining, by the terminal, a second charging policy based on the battery capacity, where the second charging policy includes a second voltage and a second current for charging the battery and charging, by the terminal, the battery according to the second charging policy.

20 Claims, 4 Drawing Sheets

(58) Field of Classification Search
USPC .................. 320/125, 134, 136, 150, 160
See application file for complete search history.

(56) References Cited

U.S. PATENT DOCUMENTS

| | | | |
|---|---|---|---|
| 7,888,913 B1* | 2/2011 | Marty | H02J 7/0069 |
| | | | 320/132 |
| 9,499,066 B2* | 11/2016 | Christen | B60L 11/1864 |
| 2007/0139008 A1 | 6/2007 | Sterz et al. | |
| 2013/0020994 A1 | 1/2013 | Christen et al. | |
| 2016/0049806 A1 | 2/2016 | Zhao et al. | |
| 2019/0113581 A1* | 4/2019 | Kawamura | G01R 31/382 |

FOREIGN PATENT DOCUMENTS

| | | |
|---|---|---|
| CN | 201150005 Y | 11/2008 |
| CN | 102214938 A | 10/2011 |
| CN | 102544609 A | 7/2012 |
| CN | 102569927 A | 7/2012 |
| CN | 102820679 A | 12/2012 |
| CN | 102890245 A | 1/2013 |

OTHER PUBLICATIONS

Foreign Communication From a Counterpart Application, PCT Application No. PCT/CN2017/087286, English Translation of International Search Report dated Sep. 12, 2017, 2 pages.
Foreign Communication From a Counterpart Application, PCT Application No. PCT/CN2017/087286, English Translation of Written Opinion dated Sep. 12, 2017, 4 pages.
Machine Translation and Abstract of Chinese Publication No. CN102820679, Dec. 12, 2012, 26 pages.
Foreign Communication From a Counterpart Application, Chinese Application No. 201780005441.2, Chinese Office Action dated Dec. 24, 2019, 8 pages.

* cited by examiner

BATTERY CHARGING MANAGEMENT METHOD AND TERMINAL

CROSS-REFERENCE TO RELATED APPLICATIONS

This application is a U.S. National Stage of International Patent Application No. PCT/CN2017/087286 filed on Jun. 6, 2017, which claims priority to Chinese Patent Application No. 201611083493.5 filed on Nov. 30, 2016. Both of the aforementioned applications are hereby incorporated by reference in their entireties.

TECHNICAL FIELD

Embodiments of the present invention relate to the field of battery management, and in particular, to a battery charging management method and a terminal.

BACKGROUND

With rapid development of mobile devices such as a mobile phone, there is an increasingly high expectation for battery performance. A lithium-ion battery (Lithium-ion battery) has both high specific energy and high specific power, and currently is used as an ideal power and energy storage battery system. A capacity of an ideal lithium-ion battery is always a specific value without changing during a life span. However, an actual situation is complex. For example, any secondary reaction that can generate or consume lithium ions or electrons may cause a change in a capacity balance of the battery. The change in the capacity balance of the lithium-ion battery is usually irreversible, and continuously accumulates after a plurality of cycles. This adversely affects battery performance.

To reduce the foregoing adverse impact, a charging voltage and a charging current may be properly adjusted in a charging process of the lithium-ion battery. For example, the voltage may be reduced and the current may be limited during charging based on a quantity of battery charging times. However, calculation of the quantity of battery charging times is inaccurate in the prior art, and there is no linear relationship between the quantity of battery charging times and a battery capacity. Consequently, a time for voltage reduction and current limitation during battery charging is not accurately selected, affecting a life span of the battery and reducing battery charging safety.

SUMMARY

Embodiments of the present invention provide a battery charging management method and a terminal, to resolve a problem that a time for performing voltage reduction and current limitation on a battery cannot be accurately selected, causing adverse impact on battery performance.

According to a first aspect, the present invention provides a battery charging management method. The method is applied to a terminal including a battery and includes: charging, by the terminal, the battery according to a first charging policy, where the first charging policy includes a first voltage and a first current that are used for charging the battery; obtaining, by the terminal, a battery capacity of the battery when the terminal fully charges the battery for N times, where N is a positive integer; determining, by the terminal, a second charging policy based on the battery capacity, where the second charging policy includes a second voltage and a second current that are used for charging the battery; and charging, by the terminal, the battery according to the second charging policy. The battery capacity is obtained when the battery is fully charged, so that the terminal can obtain an accurate battery capacity and determine a charging policy based on the accurate battery capacity, to perform voltage reduction and current limitation of different degrees on battery charging at a proper time, thereby prolonging a life span of the battery, lowering an aging speed of the battery, and improving battery charging safety.

In a possible embodiment, the terminal obtains charging information of the battery each time charging the battery, and counts current charging as one time of full charging when the charging information meets a preset condition. The charging information includes a battery-charging termination power value and at least one of a battery charging temperature or a battery-charging initial power value. The full charging means that when a predetermined condition is met, the terminal charges the battery until charging is terminated and available power of the battery reaches 100% of the battery capacity. The charging information of the battery in each charging process is obtained, so that when the charging information meets the preset condition, the terminal can determine whether the battery is fully charged, to obtain accurate battery capacity information.

In a possible embodiment, the obtaining, by the terminal, a battery capacity of the battery when the terminal fully charges the battery for N times includes: calculating, by the terminal, the battery capacity when the terminal fully charges the battery for N times, where the battery capacity is an average of N battery-charging termination power values obtained in the N times of full charging. The average of the N battery-charging termination power values obtained in the N times of full charging is used as the battery capacity, so that accuracy of obtaining the battery capacity can be improved.

In a possible embodiment, the preset condition includes at least one of the following conditions: the battery charging temperature is greater than or equal to a first threshold and is less than or equal to a second threshold, and a variation of the battery-charging termination power value relative to the battery capacity is less than or equal to a third threshold; or the battery-charging initial power value is less than or equal to a fourth threshold, and a variation of the battery-charging termination power value relative to the battery capacity is less than or equal to a third threshold. By setting the preset condition, the terminal may determine, based on an actual condition of the battery, a full charging process suitable for the battery.

In a possible embodiment, the determining a second charging policy based on the battery capacity includes: when the quantity N of full charging times is greater than or equal to a fifth threshold, determining the second charging policy based on the battery capacity. Therefore, the terminal may obtain sufficient battery capacity data to improve accuracy and reliability of obtaining the battery capacity.

In a possible embodiment, the determining a second charging policy based on the battery capacity includes: when the quantity N of full charging times is less than a fifth threshold, determining the second charging policy based on the battery capacity and a quantity of battery charging times. Therefore, the terminal can be prevented from encountering a problem of unreliable battery capacity data resulted from an insufficient quantity of full charging times, thereby improving accuracy and reliability of obtaining the battery capacity.

In a possible embodiment, the second voltage is less than the first voltage, or the second current is less than the first current. Voltage reduction and current limitation are performed on battery charging, thereby prolonging the life span of the battery, lowering the aging speed of the battery, and improving the battery charging safety.

According to a second aspect, an embodiment of the present invention provides a terminal, including a processor, a memory, a power supply management module, and a battery, where the power supply management module is configured to charge the battery according to a first charging policy, where the first charging policy includes a first voltage and a first current that are used for charging the battery; the processor is configured to obtain a battery capacity of the battery when the battery is fully charged for N times, where N is a positive integer, and is further configured to determine a second charging policy based on the battery capacity, where the second charging policy includes a second voltage and a second current that are used for charging the battery; and the power supply management module is further configured to charge the battery according to the second charging policy. The battery capacity is obtained when the battery is fully charged, so that the terminal can obtain an accurate battery capacity and determine a charging policy based on the accurate battery capacity, to perform voltage reduction and current limitation of different degrees on battery charging at a proper time, thereby prolonging a life span of the battery, lowering an aging speed of the battery, and improving battery charging safety.

In a possible embodiment, the power supply management module is further configured to obtain charging information of the battery each time charging the battery, where the charging information includes a battery-charging termination power value and at least one of a battery charging temperature or a battery-charging initial power value; and the processor is further configured to count current charging as one time of full charging when the charging information meets a preset condition. The charging information of the battery in each charging process is obtained, so that when the charging information meets the preset condition, the terminal can determine whether the battery is fully charged, to obtain accurate battery capacity information.

In a possible embodiment, the processor is further configured to calculate the battery capacity when the battery is fully charged for N times, where the battery capacity is an average of N battery-charging termination power values obtained in the N times of full charging. The average of the N battery-charging termination power values obtained in the N times of full charging is used as the battery capacity, so that accuracy of obtaining the battery capacity can be improved.

In a possible embodiment, the preset condition includes at least one of the following conditions: the battery charging temperature is greater than or equal to a first threshold and is less than or equal to a second threshold, and a variation of the battery-charging termination power value relative to the battery capacity is less than or equal to a third threshold; or the battery-charging initial power value is less than or equal to a fourth threshold, and a variation of the battery-charging termination power value relative to the battery capacity is less than or equal to a third threshold. By setting the preset condition, the terminal may determine, based on an actual condition of the battery, a full charging process suitable for the battery.

In a possible embodiment, the processor is further configured to: when the quantity N of full charging times is greater than or equal to a fifth threshold, determine the second charging policy based on the battery capacity. Therefore, the terminal may obtain sufficient battery capacity data to improve accuracy and reliability of obtaining the battery capacity.

In a possible embodiment, the processor is further configured to: when the quantity N of full charging times is less than a fifth threshold, determine the second charging policy based on the battery capacity and a quantity of battery charging times. Therefore, the terminal can be prevented from encountering a problem of unreliable battery capacity data resulted from an insufficient quantity of full charging times, thereby improving accuracy and reliability of obtaining the battery capacity.

In a possible embodiment, the second voltage is less than the first voltage, or the second current is less than the first current. Voltage reduction and current limitation are performed on battery charging, thereby prolonging the life span of the battery, lowering the aging speed of the battery, and improving aged-battery charging safety.

Optionally, in the first aspect or the second aspect, the first threshold is 10° C., the second threshold is 40° C., the third threshold is 5% of the battery capacity, and the fourth threshold is 20% of the battery capacity.

According to a third aspect, a terminal is provided, and the terminal has functions of implementing methods according to the first aspect. The functions may be implemented by hardware, or may be implemented by hardware by executing corresponding software. The hardware or the software includes one or more modules corresponding to the foregoing functions.

According to a fourth aspect, a computer program product that includes an instruction is provided, and when the instruction runs on a terminal, the terminal executes the method according to the first aspect.

According to a fifth aspect, a computer readable storage medium is provided. The computer readable storage medium stores an instruction. When the instruction runs on a terminal, the terminal executes the method according to the first aspect.

According to the technical solutions provided in the embodiments of the present invention, the terminal can accurately obtain the battery capacity, reliably monitor a health condition of the battery based on the battery capacity or both the battery capacity and the quantity of battery charging times, and determine a corresponding charging policy based on the health condition of the battery, to perform voltage reduction and current limitation of different degrees on battery charging at a proper time, thereby prolonging the life span of the battery, lowering the aging speed of the battery, and improving the battery charging safety.

DESCRIPTION OF EMBODIMENTS

The following describes the embodiments of the present invention with reference to the accompanying drawings in the embodiments of the present invention.

It should be noted that, the ordinal numbers such as "first" and "second" mentioned in the embodiments of the present invention shall only serve the purpose of differentiation unless the numbers definitely indicate a sequence according to the context.

A battery charging management method provided in the embodiments of the present invention may be applied to any terminal that has a battery. The terminal may be a mobile phone, a tablet personal computer (tablet personal computer, TPC), a laptop computer (laptop computer), a digital camera, a projection device, a wearable device (wearable device), a personal digital assistant (personal digital assistant, PDA), an e-book reader (e-book reader), a virtual reality intelligent device, a digital broadcast terminal, a message transceiver device, a game console, a medical device, a fitness device, a scanner, or the like. The terminal may establish communication with a network by using 2G, 3G, 4G, 5G, or a wireless local access network (wireless local access network, WLAN).

Figure 1:
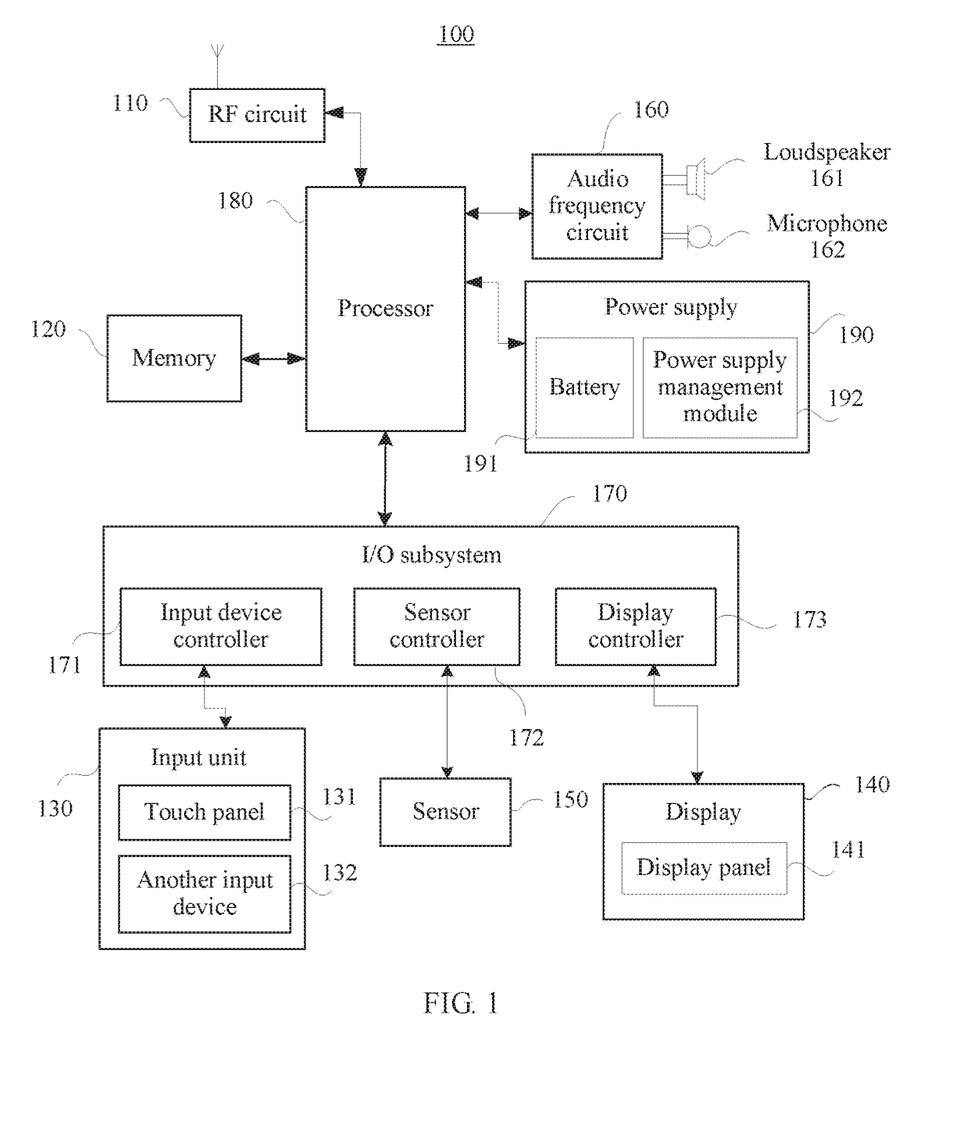
FIG. 1 is a schematic structural diagram of a terminal according to an embodiment of the present invention.

In the embodiments of the present invention, that the terminal is a mobile phone is used as an example for description. FIG. 1 shows a block diagram of a partial structure of a mobile phone 100 related to the embodiments of the present invention. As shown in FIG. 1, the mobile phone 100 includes components such as a radio frequency (radio frequency, RF) circuit 110, a memory 120, an input unit 130, a display screen 140, a sensor 150, an audio frequency circuit 160, an input/output (input/output, I/O) subsystem 170, a processor 180, and a power supply 190. A person skilled in the art may understand that the structure of the terminal shown in FIG. 1 is only used as an example of implementation, and imposes no limitation on the mobile phone. The terminal may include more or fewer components than those shown in the figure, or a combination of some components, or different component arrangements.

The RF circuit 110 may be configured to receive and send a signal in an information receiving or sending process or a call process; particularly, after receiving downlink information from a base station, send the downlink information to the processor 180 for processing; and send designed uplink data to the base station. Generally, the RF circuit includes but is not limited to an antenna, at least one amplifier, a transceiver, a coupler, a low noise amplifier (low noise amplifier, LNA), and a duplexer. In addition, the RF circuit 110 may further communicate with a network and another device through wireless communication. The wireless communication may use any communications standard or protocol, including but not limited to Global System for Mobile Communications (global system for mobile communications, GSM), a general packet radio service (general packet radio service, GPRS), Code Division Multiple Access (code division multiple access, CDMA), Wideband Code Division Multiple Access (wideband code division multiple access, WCDMA), Long Term Evolution (long term evolution, LTE), an email, a Short Message Service (short message service, SMS), and the like.

The memory 120 may be configured to store a software program and a module. The processor 180 executes various functional applications and data processing of the mobile phone 100 by running the software program and the module stored in the memory 120. The memory 120 may include a program storage area and a data storage area. The program storage area may store an operating system, and an application program required by at least one function (such as a sound playing function or an image playing function), and the like. The data storage area may store data (such as audio data, video data, or an address book) created based on use of the mobile phone 100, and the like. In addition, the memory 120 may include a volatile memory such as a nonvolatile random access memory (nonvolatile random access memory, NVRAM), a phase change random access memory (phase change RAM, PRAM), or a magnetoresistive random access memory (magnetoresistive RAM, MRAM), or may include a nonvolatile memory such as at least one magnetic disk storage device, an electrically erasable programmable read-only memory (electrically erasable programmable read-only memory, EEPROM), a flash memory device such as a NOR flash memory (NOR flash memory) or a NAND flash memory (NAND flash memory), a semiconductor such as a solid state disk (Solid State Disk, SSD), or the like.

The input unit 130 may be configured to: receive input digit or character information, and generate key signal input related to a user setting and function control of the mobile phone 100. Specifically, the input unit 130 may include a touch panel 131 and another input device 132. The touch panel 131, also referred to as a touchscreen, may collect a touch operation performed by a user on or near the touch panel (for example, an operation performed by the user on or near the touch panel 131 by using any suitable object or accessory such as a finger or a stylus), and may drive a corresponding connection apparatus based on a preset program. Optionally, the touch panel 131 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 180, and can receive and execute a command sent by the processor 180. In addition, the touch panel 131 may be implemented by using a plurality of types, such as a resistive type, a capacitive type, an infrared ray, and a surface acoustic wave. In addition to the touch panel 131, the input unit 130 may include the another input device 132. Specifically, the another input device 132 may include but is not limited to one or more of a physical keyboard, a function key (such as a volume control key or an on/off key), a trackball, a mouse, a joystick, and the like.

The display screen 140 may be configured to display information entered by the user or information provided for the user, and various interfaces of the mobile phone 100. The display screen 140 may include a display panel 141, and optionally, the display panel 141 may be configured in a form of a liquid crystal display (Liquid Crystal Display, LCD), a thin film transistor LCD (Thin Film Transistor LCD, TFT-LCD), a light emitting diode (Light Emitting Diode, LED), an organic light-emitting diode (Organic Light-Emitting Diode, OLED), or the like. Further, the touch panel 131 may cover the display panel 141. When detecting a touch operation on or near the touch panel 131, the touch panel 131 transmits the touch operation to the processor 180 to determine a type of a touch event, and then the processor 180 provides corresponding visual output on the display panel 141 based on the type of the touch event. Although the touch panel 131 and the display panel 141 in FIG. 1 are used as two independent components to implement input and input functions of the mobile phone 100, in some embodiments, the touch panel 131 and the display panel 141 may be integrated to implement the input and output functions of the mobile phone 100. The display screen 140 may be configured to display content, where the content includes a user interface, such as a startup interface of a terminal, and a user interface of an application program. The content may include information and data in addition to the user interface. The display screen 140 may be a built-in screen of the terminal or another external display device.

The sensor 150 includes at least one light sensor, a motion sensor, a location sensor, and another sensor. Specifically, the light sensor may include an ambient light sensor and a proximity sensor. The ambient light sensor may obtain luminance of ambient light. The proximity sensor may close the display panel 141 and/or backlight when the mobile phone 100 approaches an ear. The motion sensor may include an acceleration sensor that may detect acceleration magnitudes in all directions (generally three axes). When the acceleration sensor is stationary, the acceleration sensor may detect a magnitude and a direction of gravity, and may be configured to recognize a posture application of the mobile phone (such as switching between landscape and portrait, related games, and magnetometer posture calibration), vibration recognition related functions (such as a pedometer and a knock), and the like. The location sensor may be configured to obtain geographical location coordinates of the terminal. The geographic location coordinates may be obtained by using a Global Positioning System (Global Positioning System, GPS), a COMPASS System (COMPASS System), a GLONASS System (GLONASS System), and a Galileo system (GALILEO System). The location sensor may alternatively perform positioning by using a base station of a mobile operation network or a local area network such as Wi-Fi or Bluetooth, or by comprehensively using the foregoing positioning manners, to obtain more accurate mobile phone location information. A gyroscope, a barometer, a hygrometer, a thermometer, an infrared sensor, and other sensors may be further configured for the mobile phone 100. Details are not described herein.

The audio frequency circuit 160, a loudspeaker 161, and a microphone 162 (also referred to as a microphone) may provide an audio interface between the user and the mobile phone 100. The audio frequency circuit 160 may transmit, to the loudspeaker 161, an electrical signal converted from received audio data, and the loudspeaker 161 converts the electrical signal into a sound signal for output. In addition, the microphone 162 converts a collected sound signal into an electrical signal, the audio frequency circuit 160 converts the electrical signal into audio data after receiving the electrical signal, and outputs the audio data to the processor 180 for processing, and then the audio data is sent to, for example, another terminal by using the RF circuit 110, or the audio data is output to the memory 120 for further processing.

The I/O subsystem 170 may be configured to input or output various types of information or data of the system. The I/O subsystem 170 includes an input device controller 171, a sensor controller 172, and a display controller 173. The I/O subsystem 170 receives, by using the foregoing controllers, various types of data sent by the input unit 130, the sensor 150, and the display screen 140, and controls the foregoing components by sending a control instruction.

The user manually or the mobile phone 100 automatically sets the foregoing parameters, and a camera 175 may obtain an image of a captured object. The image is a bitmap including pixel arrays.

The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, to perform overall monitoring on the mobile phone. The processor 180 may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate: array (Field Programmable Gate Array, FPGA) or another programmable logic device, a transistor logic device, a hardware component, or any combination thereof. The processor 180 may implement or execute various examples of logical blocks, modules, and circuits that are described with reference to content disclosed in this application. Alternatively, the processor 180 may be a combination of processors implementing a computing function, for example, a combination of one or more microprocessors, or a combination of the DSP and a microprocessor. Optionally, the processor 180 may include one or more processor units. Optionally, an application processor and a modem processor may be integrated into the processor 180, where the application processor mainly processes an operating system, a user interface, an application program, and the like; and the modem processor mainly processes wireless communications. It may be understood that the modem processor may not be integrated into the processor 180.

The application program includes any application installed on the mobile phone 100, and includes but is not limited to a browser, an e-mail, an instant messaging service, word processing, a virtual keyboard, a widget (Widget), encryption, digital rights management, speech recognition, speech reproduction, positioning (for example, a function provided by a GPS), and music playing.

The mobile phone 100 further includes the power supply 190 that supplies power for each part. The power supply 190 includes a battery 191 and a power supply management module 192. The battery 191 is connected to the processor 180 by using a power supply circuit. The power supply management module 192 is logically connected to the processor 180 to implement functions such as charging/discharging management and power consumption management by using the power supply management module 192. The battery 191 may be a lithium-ion (Li-ion) battery. The lithium-ion battery may include a liquified lithium-ion battery (liquified lithium-ion battery, LIB) or a polymer lithium-ion battery (polymer lithium-ion battery, PLB).

It should be noted that although not shown, the mobile phone 100 may further include a short-distance wireless transmission component such as a Wireless Fidelity (Wi-Fi) module and Bluetooth, and details are not described herein.

Figure 2:
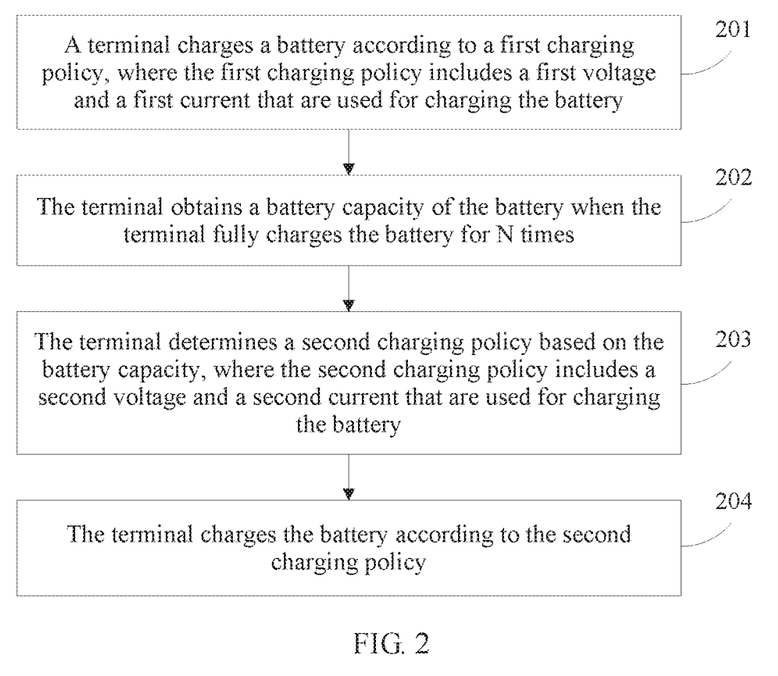
FIG. 2 is a flowchart of a battery charging management method according to an embodiment of the present invention.

The following describes a battery charging management method provided in an embodiment of the present invention with reference to FIG. 2. FIG. 2 is a flowchart of the battery charging management method, and the method may be performed by the terminal shown in FIG. 1. The method includes:

Step 201: The terminal charges a battery according to a first charging policy, where the first charging policy includes a first voltage and a first current that are used for charging the battery.

Step 202: The terminal obtains a battery capacity of the battery when the terminal fully charges the battery for N times.

Step 203: The terminal determines a second charging policy based on the battery capacity, where the second charging policy includes a second voltage and a second current that are used for charging the battery.

Step 204: The terminal charges the battery according to the second charging policy.

In step 201, generally, battery charging may be divided into four phases: low-voltage pre-charging, constant-current charging, constant-voltage charging, and trickle charging. Optionally, battery charging may be divided into three phases: constant-current charging, constant-voltage charging, and trickle charging. In the constant-current charging phase, the terminal charges the battery with a constant charging current, and the constant charging current is a maximum current of the battery in a charging process. In the constant-voltage charging phase, the terminal charges the battery with a constant charging voltage, and the constant charging voltage is a maximum voltage of the battery in the charging process.

The charging policy may also be referred to as a safety policy, and is used to determine a constant charging voltage and a constant charging current that can be used when the terminal charges the battery. The constant charging voltage may be less than or equal to a rated charging voltage, and the constant charging current may be less than or equal to a rated charging current. The rated charging voltage is a maximum charging voltage allowed during battery charging, and the rated charging current is a maximum charging current allowed during battery charging.

The charging policy may be as follows: the terminal may simultaneously adjust the constant charging current and the constant charging voltage, for example, reduce both the constant charging voltage and the constant charging current, or separately adjust the constant charging voltage and the constant charging current, for example, keep the constant charging current unchanged and reduce the constant charging voltage. It should be noted that when no ambiguity is caused, in this application, the constant charging voltage and the constant charging current are briefly referred to as a charging voltage and a charging current respectively.

Similar to the charging policy, the first charging policy includes a first charging voltage and a first charging current that can be used when the terminal charges the battery.

The first charging policy may be determined based on whether the terminal stores historical data of battery charging.

In an example, when the battery is a new battery or a replaced battery, and the terminal has no historical data of battery charging or the historical data is invalid (for example, the historical data is deleted), the terminal may charge the battery by using the rated charging voltage and the rated charging current, that is, the first charging voltage and the first charging current are respectively equal to the rated charging voltage and the rated charging current.

In another example, after the battery has been used and is charged, the terminal stores historical data of battery charging, so that the terminal can select an existing charging policy as the first charging policy according to the historical data. The terminal may select the existing charging policy by using a known method, and details are not described herein.

The historical data may include at least one of the following data: a battery capacity, a quantity of battery charging times, or a quantity of full charging times. The terminal may obtain the historical data by using a power supply management module or a processor.

The battery capacity may indicate a quantity of electricity that can be released after the battery is fully charged under a condition (for example, a preset discharge rate or temperature, or an end-of-discharge voltage). Generally, the battery has a rated battery capacity and an actual battery capacity.

The rated battery capacity is also referred to as a battery nominal capacity, indicating a quantity of electricity that can be released by the battery under an ideal condition specified by a design. The terminal may obtain the rated battery capacity from internally stored data or an external database. For example, the terminal may store the rated battery capacity in system information of the terminal at factory delivery. Alternatively, the terminal may obtain, by reading a sequence number of the battery and using an external network, battery information corresponding to the sequence number. The battery information may include a manufacturer, a production date, the rated battery capacity, and the like.

The actual battery capacity may indicate a quantity of electricity that can be released by the battery under an actual condition. An actual battery capacity of a new battery is usually the same as a rated battery capacity. Due to use and aging of the battery, the actual battery capacity gradually decreases relative to the rated battery capacity. Therefore, the actual battery capacity may be used to measure battery performance and reflect a health condition of the battery (also referred to as an aging degree). It should be noted that, in this application, when no ambiguity is caused, the actual battery capacity is briefly referred to as a battery capacity.

The quantity of battery charging times is also referred to as a quantity of battery charging/discharging period times or a quantity of battery charging/discharging cycle times, and one time of battery charging means that the battery completes one time of charging and discharging 100% of the battery capacity. The quantity of battery charging times is updated each time the battery is charged. In other words, the quantity of battery charging times records each charging process of the battery. For example, when battery charging starts, initial battery power is 40% of the battery capacity, and when battery charging is terminated, the battery power reaches 100% of the battery capacity. In the charging process, charged power is 60% of the battery capacity. Therefore, current charging may be recorded as 0.6 charging/discharging period, in other words, the quantity of battery charging times increases by 0.6 relative to that before the current charging. For another example, when battery charging starts, initial battery power is 30% of the battery capacity. If the battery is charged to enable the battery power to reach 80% of the battery capacity, charged power is 50% of the battery capacity. Therefore, current charging may be recorded as 0.5 charging/discharging period, in other words, the quantity of battery charging times increases by 0.5 relative to that before the current charging.

Figure 3:
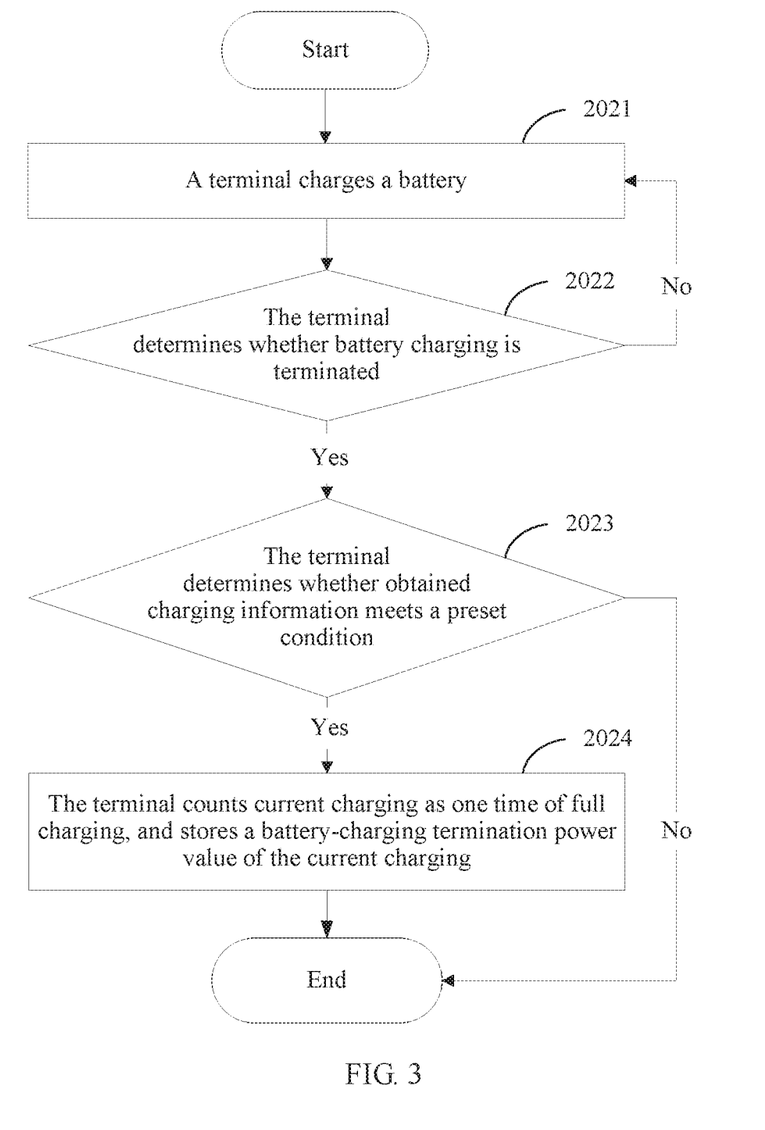
FIG. 3 is a flowchart of obtaining a quantity of full charging times by a terminal according to an embodiment of the present invention.

In step 202, for a method for obtaining the quantity N of full charging times by the terminal, refer to the following description of FIG. 3. The full charging means that when a predetermined condition is met, the terminal charges the battery until charging is terminated and available power of the battery reaches 100% of the battery capacity. Charging termination (or referred to as charging ending) may mean that the terminal stops charging the battery when the battery is fully charged. It should be noted that charging termination is different from charging interruption. Charging interruption means that the terminal stops charging the battery before the battery is fully charged, for example, a user manually stops charging or an unexpected power failure occurs.

When the battery completes N times of full charging, the terminal may obtain the battery capacity based on N battery-charging termination power values obtained in the N times of full charging. The terminal may obtain one battery-charging termination power value each time the battery is fully charged. The battery-charging termination power value may be an available power value of the battery when battery charging is terminated. In other words, the battery-charging termination power value is a power value of the fully charged battery.

In an example, the terminal may calculate an average based on the N battery-charging termination power values, and use the average as the battery capacity. The average may be an arithmetic average value, a geometric average value, a square average value, a harmonic average value, or the like of the N battery-charging termination power values. These average values may be calculated by using a known method. The average of the N battery-charging termination power values is used as the battery capacity, thereby reducing or eliminating an error resulted from a single time of measurement of a battery-charging termination power value, and improving precision of obtaining the battery capacity.

In another example, the terminal may use a median of the N battery-charging termination power values as the battery capacity. The median may be a value at a middle location in a sequence order of the N battery-charging termination power values. The median of the N battery-charging termination power values is used as the battery capacity, thereby eliminating impact exerted by an extreme value of the battery-charging termination power value, for example, the battery-charging termination power value being significantly deviated from a normal value due to an external disturbance.

FIG. 3 shows a flowchart of obtaining a quantity of full charging times by a terminal, including the following steps.

Step 2021: The terminal charges a battery.

The terminal may charge the battery according to the first charging policy in step 201 each time.

Step 2022: The terminal determines whether battery charging is terminated; and if battery charging is terminated, performs step 2023, or if battery charging is not terminated, performs step 2021 again.

Step 2023: The terminal determines whether obtained battery charging information meets a preset condition, and if the obtained battery charging information meets the preset condition, performs step 2024, or if the obtained battery charging information does not meet the preset condition, the terminal does not count current charging as one time of full charging.

Step 2024: The terminal counts current charging as one time of full charging, and stores a battery-charging termination power value obtained in the current charging.

In step 2022, the terminal may determine, by using a power supply management module, whether battery charging is terminated. Specifically, battery charging termination may be determined by using a minimum current in a constant-voltage charging phase or duration of the constant-voltage charging phase.

In an example, when the minimum current in the constant-voltage charging phase is less than a predetermined current threshold, battery charging is terminated. The minimum current may be obtained by using the power supply management module. The predetermined current threshold may be a sufficiently low current such as 0.01 C, where C indicates a charge/discharge rate, and a value of C is equal to a rated battery capacity. If the rated battery capacity is 1000 mAh, 0.01 C indicates 10 mA.

In another example, timing starts when the battery enters the constant-voltage charging phase. When the duration of the constant-voltage charging phase exceeds a preset time threshold such as two hours, battery charging is terminated.

In other examples, the terminal may further determine, by using a known method, whether battery charging is terminated, and details are not described herein.

In step 2023, the terminal may obtain the battery charging information by using the power supply management module. The charging information may include a battery-charging termination power value and at least one of a battery charging temperature or a battery-charging initial power value.

The battery charging temperature may be a battery temperature a battery charging process. The battery temperature may be obtained by using a thermoelectric sensor or another known method, and details are not described herein. In the charging process, the battery temperature may continuously change as charging proceeds. Therefore, an average of temperatures obtained through a plurality of times of measurement in the charging process may be used as the battery charging temperature.

In an example, the terminal may measure the battery temperature for a plurality of times in the charging process at a preset time interval, calculate an average of the plurality of temperatures, and use the average as the battery charging temperature. The preset time interval may be set to, for example, 1 s, 2 s, or 5 s based on an actual need. This is not limited in this application.

In another example, the battery charging temperature may also be a battery temperature obtained when battery charging starts or ends, or an average of the two battery temperatures.

The battery-charging initial power value may be an available power value (or a remaining power value) of the battery when charging starts.

In one example, the battery-charging initial power value may be obtained by using a state of charge (state of charge, SOC) of the battery. The SOC of the battery refers to a ratio of remaining power of the battery used for a period of time or left unused for a long time to a battery capacity. The power supply management module may detect an open-circuit voltage (open-circuit voltage, OCV) when battery charging starts. Because there is a correspondence between the OCV and the SOC of the battery, the terminal may obtain the SOC of the battery by using the OCV of the battery that is detected by the power supply management module, to calculate the battery-charging initial power value by using the SOC of the battery. When historical data of the battery capacity is stored in the terminal, battery-charging initial power value=battery capacity*SOC of the battery. When there is no historical data of the battery capacity in the terminal, battery-charging initial power value=rated battery capacity*SOC of the battery. It may be understood that the correspondence between the OCV and the SOC of the battery may be obtained by using an existing method, and details are not described herein.

In another example, the battery-charging initial power value may be obtained by using a voltameter (also referred to as a coulometer) in the power supply management module. The voltameter may be configured to measure charged power and discharged power of the battery. To obtain the battery-charging initial power value, the voltameter may measure discharged power of the battery after the battery is fully charged. When the terminal stores historical data of the battery capacity, battery-charging initial power value=battery capacity−discharged power value. The voltameter may measure the charged power and the discharged power of the battery by using an existing method, and details are not described herein.

The battery-charging termination power value may be an available power value of the battery when battery charging is terminated.

In an example, the terminal may obtain the battery-charging termination power value by summing up the battery-charging initial power value and the charged power value, namely, battery-charging termination power value=battery-charging initial power value+charged power value.

In another example, the terminal may obtain the SOC of the battery when charging starts, and battery-charging termination power value=charged power value/(1−SOC of the battery when charging starts).

It should be noted that, the battery-charging termination power value is the same as the battery capacity in an ideal condition. However, in an actual situation, for example, when a charging environment (including a charging circuit, an ambient temperature, or the like) or a health condition of the battery varies, the battery-charging termination power value may be different from a battery capacity value.

The preset condition may include at least one of the following conditions:

Condition 1: The battery charging temperature is within a preset temperature range, in other words, the battery charging temperature is greater than or equal to a first threshold, and is less than or equal to a second threshold. The first threshold (may also be referred to as a first temperature threshold) and the second threshold (may also be referred to as a second temperature threshold) may be determined based on performance and a use condition of the battery. For example, the first threshold may be 0° C. 5° C., or 10° C., and the second threshold may be 40° C., 45° C., or 50° C. When the battery is being charged, the battery temperature falls within the preset temperature range, indicating that the power supply management module and the battery currently work in a normal state. In this case, the charging information obtained by the power supply management module is accurate and reliable.

In addition, a variation of the battery-charging termination power value relative to the battery capacity is less than or equal to a third threshold. The variation is $\Delta C=|C_1-C_0|$, where $C_0$ indicates the battery capacity, and $C_1$ indicates the battery-charging termination power value. The third threshold (may also be referred to as a variation threshold) may be determined based on an actual situation, for example, 2%, 5%, or 10% of the battery capacity. This is not limited in this application. Because the battery-charging termination power value may be different from the battery capacity value, when the variation exceeds the third threshold, it may be considered that a large error occurs in measurement of the battery-charging termination power value. This is not conducive to improving precision of obtaining the battery capacity, and therefore the battery-charging termination power value obtained current time may be discarded.

Condition 2: The battery-charging initial power value is less than or equal to a fourth threshold. The fourth threshold (may also be referred to as an initial power threshold) may be determined based on an actual need. When a value of the fourth threshold is relatively small, battery charging termination requires longer duration, and higher charged power is required, improving precision of battery capacity calculation. When the value of the fourth threshold value is relatively large, battery charging termination requires shorter duration and lower charged power is required, increasing a speed of battery capacity calculation. Specifically, the value of the fourth threshold may be selected from 10% to 30% of the battery capacity. Further, the fourth threshold may be 20%, 15%, or 25% of the battery capacity. It may be understood that condition 2 may also be that the SOC of the battery is less than or equal to a preset SOC threshold. Corresponding to the fourth threshold, a value of the preset SOC threshold may be selected from 10% to 30%. Further, the preset SOC threshold may be 20%, 15%, 25%, or the like.

In addition, the variation of the battery-charging termination power value relative to the battery capacity is less than or equal to the third threshold. For this part of content, refer to related description of condition 1, and details are not described herein.

It may be understood that, when the battery charging information does not meet the preset condition, the terminal does not count current charging as one time of full charging but may update other historical data including a quantity of battery charging times.

It should be noted that the battery charging temperature and the battery-charging initial power value may be obtained before or when battery charging is terminated. Therefore, step 2023 in which the terminal determines whether the battery charging temperature and the battery-charging initial power value meet the preset condition may be performed before step 2022 or may be performed at the same as step 2022.

In step 203, as described above, the charging policy may include a charging voltage and a charging current that are used when the terminal charges the battery. Correspondingly, the second charging policy may include the second voltage and the second current that are used for charging the battery.

The terminal may separately formulate corresponding charging policies for different health conditions of the battery. For example, when the battery is in a good health condition, the charging voltage and the charging current may be a rated charging voltage and a rated charging current. When the battery is in a declining health condition, the charging voltage and the charging current may be lower than the rated charging voltage and the rated charging current. When the battery is in a significantly declining health condition, the charging voltage and the charging current may be further reduced.

It may be understood that for different terminals, a quantity of charging policies may vary, for example, increase or decrease based on an actual situation (for example, a charging environment or a battery type). Corresponding charging policies are formulated for different health conditions of the battery, thereby prolonging a life span of the battery and delaying aging of the battery. The charging voltage and the charging current of the battery in the declining health condition (that is, an aged battery) are reduced, further improving battery charging safety.

The charging policy is described in this embodiment of the present invention below by using an example in which the health condition of the battery is divided into four phases. When the health condition of the battery is divided into four phases, the charging policy may include a charging policy 1, a charging policy 2, a charging policy 3, and a charging policy 4. Specifically, in the charging policy 1, a charging voltage and a charging current may be equal to a rated charging voltage and a rated charging current; in the charging policy 2, a charging voltage may be 20 mV lower than the rated charging voltage, and a charging current may be 90% of the rated charging current; in the charging policy 3, a charging voltage may be 50 mV lower than the rated charging voltage, and a charging current may be 80% of the rated charging current; and in the charging policy 4, a charging voltage may be 200 mV lower than the rated charging voltage, and a charging current may be 60% of the rated charging current. It should be noted that decrements of the charging voltage and the charging current may be determined based on a test performed on the battery, the battery may be tested by using a known test standard or method in the art, and details are not described herein.

Because the battery capacity may reflect the health condition of the battery, the terminal may determine the second charging policy based on the battery capacity. It should be noted that the determining the second charging policy based on the battery capacity described in this embodiment of the present invention includes a case in which the second charging policy is determined based on only the battery capacity without another factor, and also includes a case in which the second charging policy is determined based on the battery capacity and another factor.

Specifically, the terminal may set a group of battery capacity thresholds. The battery capacity threshold may be determined based on a test result of the battery. The test result of the battery may be obtained by using an existing test standard or method, and details are not described herein.

In an example, the battery capacity thresholds may be 90%, 80%, and 60% of the rated battery capacity. For ease of description, the rated battery capacity is omitted below, and 90%, 80%, and 60% are used to represent the battery capacity thresholds. Generally, a larger percentage of the battery capacity to the rated battery capacity indicates a better health condition of the battery. Therefore, when the battery capacity>90%, the terminal selects the charging policy 1 as the second charging policy. When 80%<battery capacity≤90%, the terminal selects the charging policy 2 as the second charging policy. When 60%<battery capacity≤80%, the terminal selects the charging policy 3 as the second charging policy. When the battery capacity≤60%, the terminal selects the charging policy 4 as the second charging policy. Table 1 lists a correspondence between a battery capacity and a charging policy.

TABLE 1

Correspondence table between a battery capacity and a charging policy

| Battery capacity | Policy sequence number | Charging voltage | Charging current |
|---|---|---|---|
| 90% < C ≤ 100% | 1 | Unchanged | Unchanged |
| 80% < C ≤ 90% | 2 | Reduced by 20 mV | Reduced by 10% |
| 60% < C ≤ 80% | 3 | Reduced by 50 mV | Reduced by 20% |
| C ≤ 60% | 4 | Reduced by 200 mV | Reduced by 40% |

Optionally, when a quantity N of full charging times is greater than or equal to a fifth threshold, the terminal determines the second charging policy based on the battery capacity. When the quantity N of full charging times is less than the fifth threshold, the terminal may determine the second charging policy by using an existing method. The quantity N of full charging times may be obtained according to step 202. The fifth threshold (may also be referred to as a quantity threshold of full charging times) may be determined based on an actual situation, and may be, for example, 10, 20, or 50 times. This is not limited in this application. It should be understood that when the fifth threshold is large enough, it may be considered that the terminal obtains enough battery-charging termination power data. Because the battery capacity is determined by using charging information obtained through a plurality of times of full charging, accuracy and reliability of obtaining battery capacity data are improved.

It should be noted that the first charging policy in step 201 may also be determined by using the method described in step 203. In other words, the terminal may determine the first charging policy and the second charging policy by using a same method. It may be understood that the second charging policy may be the same as the first charging policy, or may be different from the first charging policy.

In step 204, the terminal may execute the second charging policy by using the power supply management module. It may be understood that the first charging policy may also be executed by using the power supply management module. A charging circuit of the power supply management module may have different adjustment precision, for example, a continuous adjustment or a step-by-step adjustment may be made on at least one of a charging voltage and a charging current. Therefore, the charging policy may be performed in different adjustment manners.

In an example, the power supply management module may continuously adjust at least one of the charging voltage and the charging current. For example, when the terminal charges the battery according to the charging policy 2, the charging voltage may be reduced by 20 mV relative to the rated charging voltage, and the charging current may be 90% of the rated charging current. When the terminal charges the battery according to the charging policy 3, the charging voltage may be reduced by 50 mV relative to the rated charging voltage, and the charging current may be 80% of the rated charging current. When the terminal charges the battery according to the charging policy 4, the charging voltage may be reduced by 200 mV relative to the rated charging voltage, and the charging current may be 60% of the rated charging current.

In another example, the power supply management module may adjust the charging voltage step by step. Power supply management modules with different precision may have different step values, such as 16 mV, 20 mV, and 50 mV. Corresponding to different charging policies, an integer multiple of the step values cannot exceed an adjustment amount of the charging voltage. For example, charging voltage adjustment precision of the power supply management module is 16 mV. When the terminal charges the battery according to the charging policy 2, the charging voltage may be reduced by 16 mV, that is, by one time of the step value, relative to the rated charging voltage. When the terminal charges the battery according to the charging policy 3, the charging voltage may be reduced by 48 mV, that is, by three times of the step value, relative to the rated charging voltage. When the terminal charges the battery according to the charging policy 4, the charging voltage may be reduced by 192 mV, that is, by 12 times of the step value, relative to the rated charging voltage. Table 2 shows an execution solution of charging policies corresponding to power supply management modules with different precision.

TABLE 2

Execution solution table of a charging policy corresponding to a power supply management module

| Policy sequence number | Charging voltage | Power supply management module | Power supply management module execution solution |
|---|---|---|---|
| 1 | Unchanged | — | Unchanged |
| 2 | Reduced by 20 mV | Step value: 16 mV | Reduced by 16 mV (reduced by one time) |
|  |  | Step value: 20 mV | Reduced by 20 mV (reduced by one time) |
|  |  | Step value: 50 mV | Unchanged |
| 3 | Reduced by 50 mV | Step value: 16 mV | Reduced by 48 mV (reduced by three times) |
|  |  | Step value: 20 mV | Reduced by 40 mV (reduced by two times) |
|  |  | Step value: 50 mV | Reduced by 50 mV (reduced by one time) |
| 4 | Reduced by 200 mV | Step value: 16 mV | Reduced by 192 mV (reduced by 12 times) |
|  |  | Step value: 20 mV | Reduced by 200 mV (reduced by 10 times) |
|  |  | Step value: 50 mV | Reduced by 200 mV (reduced by four times) |

In another example, when a maximum charge/discharge rate of the battery is relatively high, the power supply management module may keep the charging current unchanged. The charge/discharge rate may be a current value required for releasing the rated battery capacity within specified duration by the battery. The charge/discharge rate is equal to a multiple of the rated battery capacity in terms of a data value, and is usually represented by a letter C. The maximum charge/discharge rate may be a current value required for releasing the rated battery capacity within shortest duration by the battery. The maximum charge/discharge rate may be used to measure a speed of battery charging/discharging. When the maximum charge rate is relatively high, the battery may have a faster charging/discharging speed. For example, when the maximum charge rate of the battery is 1 C, and the terminal charges the battery by using the charging policy 3, the charging current is reduced by 20%, that is, 0.8 C. If the terminal charges the battery by using a charging circuit with a maximum charging current of 0.7 C, because the maximum charging current 0.7 C is less than 0.8 C, the terminal may keep the charging current of 0.7 C unchanged.

In this embodiment of the present invention, the terminal may obtain an accurate battery capacity based on full charging data of the battery, reliably monitor the health condition of the battery based on the battery capacity, and determine a corresponding charging policy based on the health condition of the battery, to perform voltage reduction and current limitation of different degrees on battery charging at a proper time, thereby prolonging the life span of the battery, lowering an aging speed of the battery, and improving the battery charging safety.

Figure 4:
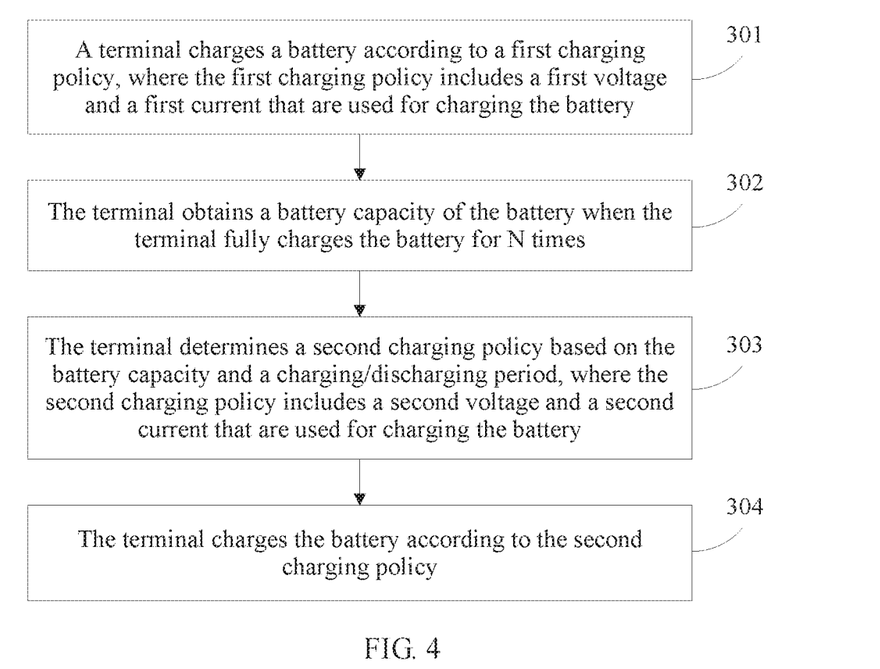
FIG. 4 is a flowchart of another battery charging management method according to an embodiment of the present invention.

The following describes another battery charging management method provided in an embodiment of the present invention with reference to FIG. 4. FIG. 4 is a flowchart of the battery charging management method, and the method may be performed by the terminal shown in FIG. 1. The method includes:

Step 301: The terminal charges a battery according to a first charging policy, where the first charging policy includes a first voltage and a first current that are used for charging the battery.

Step 302: The terminal obtains a battery capacity of the battery when the terminal fully charges the battery for N times.

Step 303: The terminal determines a second charging policy based on the battery capacity and a quantity of battery charging times, where the second charging policy includes a second voltage and a second current that are used for charging the battery.

Step 304: The terminal charges the battery according to the second charging policy.

Steps 301, 302, and 304 are respectively the same as the foregoing steps 201, 202, and 204, and details are not described herein again. The following specifically describes step 303.

In step 303, this embodiment of the present invention still uses the charging policies 1 to 4 in step 203 as an example for description. Generally, during a life span of the battery, the quantity of battery charging times may have a specific range, for example, from 400 to 600 times. Therefore, the quantity of battery charging times may also reflect a health condition (aging degree) of the battery. A smaller quantity of battery charging times indicates a better health condition and a lower aging degree of the battery and a larger quantity of battery charging times indicates a poorer health condition and a higher aging degree of the battery. Therefore, the terminal may determine the charging policy based on the quantity of battery charging times. Specifically, the terminal may set a group of quantity thresholds of battery charging times. The quantity threshold of battery charging times may be determined based on a test result of the battery. The test result of the battery may be obtained by using an existing test standard or method, and details are not described herein. For example, the quantity thresholds of battery charging times may be 400, 500, and 600 times. When the quantity of battery charging times≤400, the terminal selects the charging policy 1 as the charging policy; when 400<the quantity of battery charging times≤500, the terminal selects the charging policy 2 as the charging policy; when 500<the quantity of battery charging times≤600, the terminal selects the charging policy 3 as the charging policy; or when the quantity of battery charging times>600, the terminal selects the charging policy 4 as the charging policy. Table 3 lists a correspondence between a quantity T of battery charging times and a charging policy.

TABLE 3

Correspondence table between a quantity of battery charging times and a charging policy

| Policy sequence number | Quantity of battery charging times | Charging voltage | Charging current |
|---|---|---|---|
| 1 | T ≤ 400 | Unchanged | Unchanged |
| 2 | 400 < T ≤ 500 | Reduced by 20 mV | Reduced by 10% |
| 3 | 500 < T ≤ 600 | Reduced by 50 mV | Reduced by 20% |
| 4 | T > 600 | Reduced by 200 mV | Reduced by 40% |

The terminal may select corresponding charging policies separately based on the battery capacity and the quantity of battery charging times, and use a charging policy with the lower charging voltage and the lower charging current as the second charging policy. For example, when the battery capacity is 85% of the rated battery capacity and the quantity of battery charging times is 550, the terminal may select, according to the record in Table 2, the charging policy 2 based on the battery capacity 85%, and the terminal may select, according to the record in Table 3, the charging policy 3 based on the quantity of battery charging times 550. In comprehensive consideration of the foregoing charging policy selection results, the terminal may charge the battery by using the charging policy 3 because the charging policy 3 has the lower charging voltage and the lower charging current. The charging policy with the lower charging voltage and the lower charging current is selected, so that the terminal can improve safety of charging the battery, especially an aged battery.

Optionally, when a quantity N of full charging times is less than a preset threshold, the terminal determines the second charging policy based on the battery capacity and the quantity of battery charging times. The quantity N of full charging times may be obtained according to step 302. The preset threshold may be determined based on an actual situation, and this is not limited in this application. In an example, the preset threshold may be the fifth threshold in step 203.

It should be noted that the first charging policy in step 301 may also be determined by using the method described in step 303. In other words, the terminal may determine the first charging policy and the second charging policy by using a same method. It may be understood that the second charging policy may be the same as the first charging policy, or may be different from the first charging policy.

In this embodiment of the present invention, the terminal may reliably monitor the health condition of the battery based on the battery capacity and the quantity of battery charging times, and determine a corresponding charging policy based on the health condition of the battery, to perform voltage reduction and current limitation of different degrees on battery charging at a proper time, thereby prolonging the life span of the battery, lowering an aging speed of the battery, and improving battery charging safety.

Figure 5:
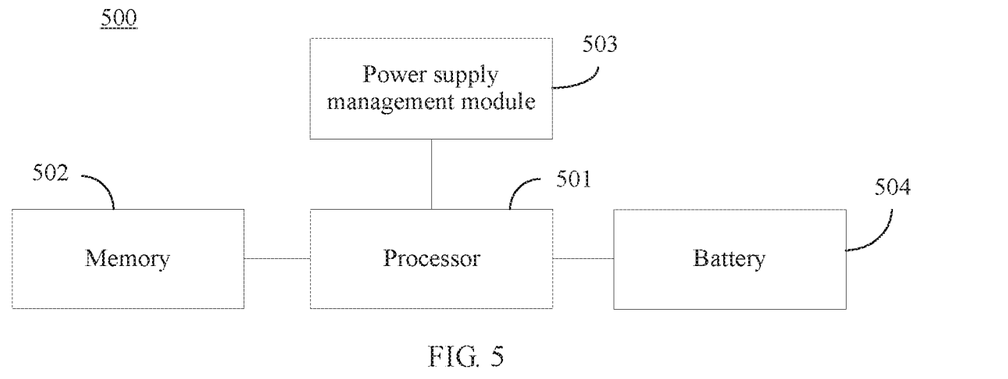
FIG. 5 is a schematic structural diagram of another terminal according to an embodiment of the present invention.

FIG. 5 is a schematic structural diagram of another terminal according to an embodiment of the present invention. The terminal may be configured to implement the methods implemented in the embodiments of the present invention shown in FIG. 2 to FIG. 4. For ease of description, only parts related to this embodiment of the present invention are shown. For technical details that are not disclosed, refer to the foregoing method embodiments of the present invention and another part of this application document. As shown in FIG. 5, the terminal 500 includes a processor 501, a memory 502, a power supply management module 503, and a battery 504.

The processor 501 is connected to the memory 502 and the power supply management module 503 by using one or more buses, and is configured to receive charging information obtained by the power supply management module 503, and invoke an execution instruction stored by the memory 502, to perform processing. The processor 501 is connected to the battery by using a power supply circuit. The processor 501 may be the processor 180 shown in FIG. 1.

The memory 502 may be the memory 120 shown in FIG. 1, or some components in the memory 120.

The power supply management module 503 may be the power supply management module 192 shown in FIG. 1.

The battery 504 may be the battery 191 shown in FIG. 1.

The power supply management module 503 is configured to charge the battery 504 according to a first charging policy, where the first charging policy includes a first voltage and a first current that are used for charging the battery 504.

The processor 501 is configured to obtain a battery capacity of the battery 504 when the terminal fully charges the battery 504 for N times, where N is a positive integer. The processor 501 is further configured to determine a second charging policy based on the battery capacity, where the second charging policy includes a second voltage and a second current that are used for charging the battery 504. Optionally, the power supply management module 503 may be further configured to determine the second charging policy based on the battery capacity.

The power supply management module 503 is further configured to charge the battery 504 according to the second charging policy.

Further, the power supply management module 503 is configured to: obtain charging information of the battery 504 each time charging the battery 504, where the charging information includes at least one of a battery charging temperature or a battery-charging initial power value; and the processor 501 is configured to count current charging as one time of full charging when the charging information meets a preset condition.

Further, the processor 501 is configured to calculate the battery capacity when the battery is fully charged for N times, where the battery capacity is an average of N battery-charging termination power values obtained in the N times of full charging.

Optionally, the processor 501 or the power supply management module 503 is further configured to determine the second charging policy based on the battery capacity and a quantity of battery charging times.

The terminal can accurately obtain the battery capacity, reliably monitor a health condition of the battery based on the battery capacity or both the battery capacity and the quantity of battery charging times, and determine a corresponding charging policy based on the health condition of the battery, to perform voltage reduction and current limitation of different degrees on battery charging at a proper time, thereby prolonging a life span of the battery, lowering an aging speed of the battery, and improving battery charging safety.

All or some of the foregoing embodiments of the present invention may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

The objectives, technical solutions, and beneficial effects of the present invention have been described in more detail with reference to specific embodiments. Any modification, equivalent replacement, or improvement made without departing from the spirit and principle of the present invention shall fall within the protection scope of the present invention.

What is claimed is:

1. A battery charging management method implemented by a terminal comprising a battery, wherein the battery charging management method comprises:
   charging the battery according to a first charging policy comprising a first voltage and a first current;
   obtaining a battery capacity of the battery in response to the terminal fully charging the battery N times, wherein N is a positive integer;
   determining a second charging policy based on the battery capacity, wherein the second charging policy comprises a second voltage and a second current; and
   charging the battery according to the second charging policy.

2. The battery charging method of claim 1, further comprising:
   obtaining charging information of the battery each time the battery is charged, wherein the charging information comprises a battery-charging termination power value and at least one of a battery charging temperature or a battery-charging initial power value; and
   counting a current charging as one time of full charging in response to the charging information meeting a preset condition.

3. The battery charging method of claim 1, wherein obtaining the battery capacity of the battery comprises calculating the battery capacity after the terminal fully charges the battery N times, and wherein the battery capacity is an average of N battery-charging termination power values obtained during the N times of full charging.

4. The battery charging method of claim 2, wherein the preset condition comprises at least one of the following conditions:
   the battery charging temperature being greater than or equal to a first threshold and being less than or equal to a second threshold, and a variation of the battery-charging termination power value relative to the battery capacity being less than or equal to a third threshold; or
   the battery-charging initial power being less than or equal to a fourth threshold, and the variation of the battery-charging termination power value relative to the battery capacity being less than or equal to the third threshold.

5. The battery charging method of claim 4, wherein the first threshold is ten degrees Celsius (° C.), and wherein the second threshold is forty ° C.

6. The battery charging method of claim 4, wherein the third threshold is five percent (%) of the battery capacity.

7. The battery charging method of claim 4, wherein the fourth threshold is twenty percent (%) of the battery capacity.

8. The battery charging method of claim 1, wherein determining the second charging policy comprises determining the second charging policy based on the battery capacity in response to a quantity of full charging times being greater than or equal to a fifth threshold, and wherein the quantity of full charging times is N.

9. The battery charging method of claim 1, wherein determining the second charging policy comprises determining the second charging policy based on the battery capacity and a quantity of battery charging times of the battery in response to a quantity of full charging times being less than a fifth threshold, and wherein the quantity of full charging times is N.

10. The battery charging method of claim 1, wherein the second voltage is less than the first voltage or wherein the second current is less than the first current.

11. A terminal, comprising:
    a battery;
    a power supply management circuit coupled to the battery and configured to charge the battery according to a first charging policy comprising a first voltage and a first current; and
    a processor coupled to the battery and the power supply management circuit and configured to:
       obtain a battery capacity of the battery in response to the battery being fully charged N times, wherein N is a positive integer; and
       determine a second charging policy based on the battery capacity, wherein the second charging policy comprises a second voltage and a second current, and
    wherein the power supply management circuit is further configured to charge the battery according to the second charging policy.

12. The terminal of claim 11, wherein the power supply management circuit is further configured to obtain charging information of the battery each time the battery is charged, wherein the charging information comprises battery-charging termination power value and at least one of a battery charging temperature or battery-charging initial power value, and wherein the processor is further configured to count a current charging as one time of full charging in response to the charging information meeting a preset condition.

13. The terminal of claim 11, wherein the processor is further configured to calculate the battery capacity after the battery is fully charged for N times, and wherein the battery capacity is an average of N battery-charging termination power values obtained during the N times of full charging.

14. The terminal of claim 12, wherein the preset condition comprises at least one of the following conditions:
    the battery charging temperature being greater than or equal to a first threshold and being less than or equal to a second threshold, and a variation of the battery-charging termination power value relative to the battery capacity being less than or equal to a third threshold; or the battery-charging initial power value being less than or equal to a fourth threshold, and the variation of the battery-charging termination power value relative to the battery capacity being less than or equal to the third threshold.

15. The terminal of claim 14, wherein the first threshold is ten degrees Celsius (° C.), and wherein the second threshold is forty ° C.

16. The terminal of claim 14, wherein the third threshold is five percent (%) of the battery capacity.

17. The terminal of claim 14, wherein the fourth threshold is twenty percent (%) of the battery capacity.

18. The terminal of claim 11, wherein the processor is further configured to determine the second charging policy based on the battery capacity in response to a quantity of full charging times being greater than or equal to a fifth threshold, and wherein the quantity of full charging times is N.

19. The terminal of claim 11, wherein the processor is further configured to determine the second charging policy based on the battery capacity and a quantity of battery charging times in response to a quantity of full charging times being less than a fifth threshold, and wherein the quantity of full charging times is N.

20. A non-transitory computer readable storage medium storing an instruction, wherein a terminal executes the instruction to:
  charge a battery according to a first charging policy comprising a first voltage and a first current;
  obtain a battery capacity of the battery in response to the terminal fully charging the battery N times, wherein N is a positive integer;
  determine a second charging policy based on the battery capacity, wherein the second charging policy comprises a second voltage and a second current; and
  charge the battery according to the second charging policy.

* * * * *